US012555699B2

United States Patent
Westenberg et al.

(10) Patent No.: US 12,555,699 B2
(45) Date of Patent: Feb. 17, 2026

(54) ANTISTATIC OR ELECTRICALLY CONDUCTIVE POLYMERIC COMPOSITION WITH REDUCED HYSTERESIS

(71) Applicant: Orion Engineered Carbons IP GmbH & Co. KG, Monheim (DE)

(72) Inventors: Hauke Westenberg, Brühl (DE); Conny Vogler, Ruppichteroth (DE); Werner Niedermeier, Brühl (DE); Florian Diehl, Neuss (DE); Daniel Vorreiter, Erftstadt (DE)

(73) Assignee: Orion Engineered Carbons IP GmbH & Co. KG, Monheim (DE)

( * ) Notice: Subject to any disclaimer, the term of this patent is extended or adjusted under 35 U.S.C. 154(b) by 0 days.

(21) Appl. No.: 18/748,616

(22) Filed: Jun. 20, 2024

(65) Prior Publication Data

US 2024/0339239 A1    Oct. 10, 2024

Related U.S. Application Data

(63) Continuation of application No. 17/761,850, filed as application No. PCT/EP2020/074084 on Aug. 28, 2020, now Pat. No. 12,068,087.

(30) Foreign Application Priority Data

Sep. 20, 2019    (EP) .................... 19198639

(51) Int. Cl.
*H01B 1/24*    (2006.01)
*C08J 3/20*    (2006.01)
(Continued)

(52) U.S. Cl.
CPC .............. *H01B 1/24* (2013.01); *C08J 3/203* (2013.01); *C08K 3/04* (2013.01); *C08L 7/00* (2013.01);
(Continued)

(58) Field of Classification Search
CPC ......... H01B 1/24; C08J 3/203; C08J 2307/00; C08K 3/04; C08K 2201/001;
(Continued)

(56) References Cited

U.S. PATENT DOCUMENTS 6,191,206 B1    2/2001  Detrano
9,721,701 B2 *  8/2017  Liu .................... H01B 7/428
(Continued)

FOREIGN PATENT DOCUMENTS

DE    4024268 A1    2/1992
DE    19917975 A1   11/2000
(Continued)

OTHER PUBLICATIONS

Donnet, "Carbon Black: Science and Technology", 1993, pp. 1-987, CRC Press, Boca Raton.
(Continued)

*Primary Examiner* — Mark Kopec
*Assistant Examiner* — Jaison P Thomas
(74) *Attorney, Agent, or Firm* — The Webb Law Firm

(57) ABSTRACT

The present disclosure provides polymeric compositions with balanced electrical and mechanical properties exhibiting reduced hysteresis comprising an electrically insulating polymeric material, a first carbon black material having a statistical thickness surface area (STSA) of below 70 m²/g and an oil absorption number (OAN) in the range from 70 to 150 mL/100 g, and a second carbon black material having a statistical thickness surface area (STSA) of at least 100 m²/g and an oil absorption number (OAN) of at least 150 mL/100 g, wherein both carbon black materials are included in an amount below its respective percolation threshold concentration, with the total amount of the first carbon black material and the second carbon black material being sufficient to render the polymeric composition antistatic or
(Continued)

electrically conductive. The polymeric compositions exhibit balanced electrical and mechanical properties and a reduced hysteresis. The disclosure also relates to a process for preparing such antistatic or electrically conductive polymeric compositions and articles produced from such compositions.

20 Claims, 1 Drawing Sheet

(51) Int. Cl.
    *C08K 3/04*     (2006.01)
    *C08L 7/00*     (2006.01)
    *C09C 1/48*     (2006.01)

(52) U.S. Cl.
    CPC ............ *C09C 1/48* (2013.01); *C01P 2006/12* (2013.01); *C01P 2006/19* (2013.01); *C01P 2006/40* (2013.01); *C08J 2307/00* (2013.01); *C08K 2201/001* (2013.01); *C08K 2201/006* (2013.01); *C08L 2203/202* (2013.01)

(58) Field of Classification Search
    CPC ........ C08K 2201/006; C08K 2201/014; C08K 2201/017; C08L 7/00; C08L 2203/202; C08L 21/00; C08L 2201/04; C09C 1/48; C01P 2006/12; C01P 2006/19; C01P 2006/40
    See application file for complete search history.

(56) References Cited

U.S. PATENT DOCUMENTS

| | | | | |
|---|---|---|---|---|
| 2008/0149363 A1* | 6/2008 | Han | ........................ | C08K 3/04 252/511 |
| 2009/0107595 A1 | 4/2009 | Nakamura | | |
| 2010/0071817 A1 | 3/2010 | Burkholder et al. | | |
| 2011/0017509 A1* | 1/2011 | Galletti | ..................... | H01B 1/24 252/511 |
| 2013/0180637 A1 | 7/2013 | Hattori | | |
| 2014/0326386 A1 | 11/2014 | Sato | | |
| 2015/0299436 A1* | 10/2015 | Shin | ...................... | B60C 1/0016 524/495 |
| 2017/0169920 A1* | 6/2017 | Liu | ......................... | H01B 7/428 |
| 2018/0207997 A1 | 7/2018 | Ishino | | |
| 2018/0319992 A1* | 11/2018 | Choi | ......................... | C09C 1/50 |
| 2019/0062522 A1 | 2/2019 | Schwaiger et al. | | |
| 2019/0385763 A1 | 12/2019 | Jin et al. | | |

FOREIGN PATENT DOCUMENTS

| | | |
|---|---|---|
| EP | 2165853 A1 | 3/2010 |
| EP | 2823972 A1 | 1/2015 |
| JP | 11116746 A | 4/1999 |
| JP | 2003211542 A | 7/2003 |
| JP | 2009179754 A | 8/2009 |
| JP | 2014218096 A | 11/2014 |
| JP | 2014218556 A | 11/2014 |
| JP | 2016041521 A | 3/2016 |
| JP | 201757354 A | 3/2017 |
| JP | 201883894 A | 5/2018 |

OTHER PUBLICATIONS

Li Zuobang et al., Translation of Common Knowledge Evidence 1: "Handbook of Fillers and Reinforcing Agents for Plastics", Apr. 1985, pp. 248-253, 1st edition, Chemical Industry Press Co., Ltd.
Translation of Common Knowledge Evidence 2: "Knowledge of Rubber, Blends, and Rubber Formulations", Apr. 1997, pp. 58-60, 1st edition, Chemical Industry Press Co., Ltd.

* cited by examiner

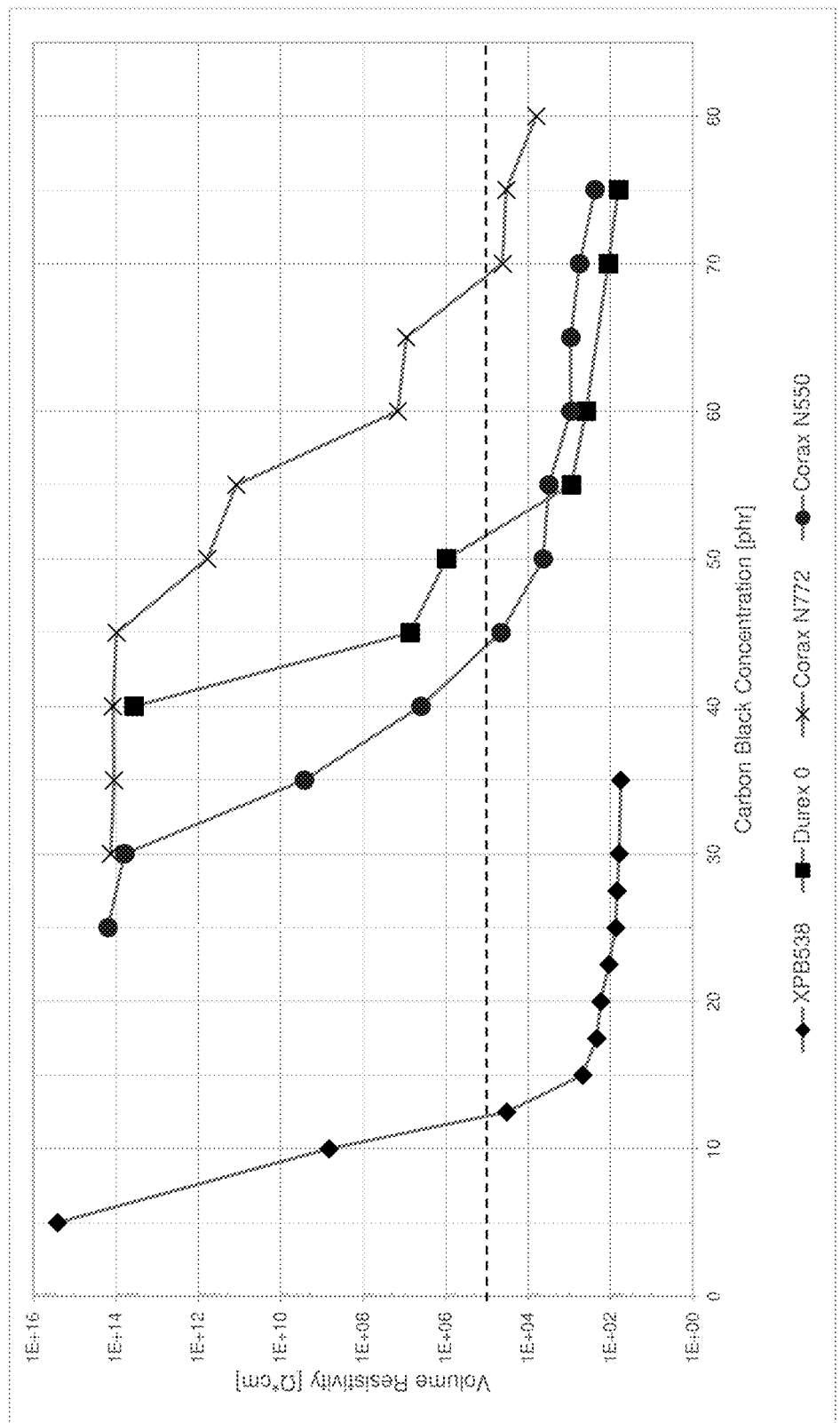

ANTISTATIC OR ELECTRICALLY CONDUCTIVE POLYMERIC COMPOSITION WITH REDUCED HYSTERESIS

CROSS REFERENCE TO RELATED APPLICATIONS

This application is a continuation application of U.S. patent application Ser. No. 17/761,850 filed Mar. 18, 2022, which is the United States national phase of International Application No. PCT/EP2020/074084 filed Aug. 28, 2020, and claims priority to European Patent Application No. 19198639.7 filed Sep. 20, 2019, the disclosures of which are hereby incorporated by reference in their entirety.

BACKGROUND OF THE INVENTION

Technical Field

The invention relates to electrostatic dissipative and electrically conductive polymeric compositions having balanced electrical and mechanical properties and a reduced hysteresis. More specifically, the invention concerns a polymeric composition containing a characteristic combination of two types of carbon black materials, a first one with low specific surface area and moderate structure and a second one with high specific surface area and structure, each used at a concentration below its respective percolation threshold concentration. The invention further relates to a process for preparing such antistatic or electrically conductive polymeric compositions and to articles made therefrom.

Technical Background

Polymeric compositions such as rubber compositions are widely applied for manufacturing numerous industrial products such as transmission and conveyor belts, tires or footwear. The polymer materials are typically electrically insulating. Many applications require though that the compositions are electrically conductive or antistatic, e.g. to prevent electrostatic charging for safety reasons.

Electrical conductivity can be imparted to polymeric compositions by addition of a particulate filler of high intrinsic conductivity such as carbon black, carbon fibers or metallic fibers. Carbon black materials are inherently electrically conductive due to their graphite substructure and can hence be incorporated in originally insulating polymer compositions as conductive fillers or antistatic agents. Their influence on the electrical properties of the polymeric composition depends inter alia on the carbon black morphology and structure. Numerous conventional carbon blacks, e.g. ASTM grade carbon blacks, are available on the market and used in the art as conductive fillers or antistatic agents for polymeric compositions. Nevertheless, in order to impart electrically dissipative or conductive properties, such conventional carbon blacks typically have to be applied in relatively high concentrations. This however means not only a high consumption of resources, but may also adversely affect other properties of the polymeric composition such as mechanical properties like stiffness or hardness or hysteresis characteristics. In particular, it generally causes a substantial increase of the composition's hysteresis, i.e. the energy losses upon dynamic deformation. In view of steadily increasing performance requirements and introduced global $CO_2$ regulations it would however be desirable at least in some fields of applications such as the tire industry to provide polymer compositions with reduced hysteresis, e.g. for the production of fuel saving tires with a low rolling resistance, which still meet the requirements in terms of electrical and mechanical properties.

Specially developed highly conductive carbon blacks (also referred to as extraconductive carbon blacks) may impart antistatic or conductive properties to polymeric compositions at lower concentrations. However, these specialty carbon blacks are comparatively expensive, of limited availability in high volumes and sometimes difficult to adequately process and/or disperse in polymer materials. Moreover, they typically do not stiffen and strengthen the polymeric compositions to an extent sufficient for many applications at least at low filler levels.

The use of mixtures or combinations of different conductive fillers has also previously been considered in the art.

Thus, DE 40 24 268 A1 discloses electrically conductive polymer compounds, which comprise carbon black and/or pulverulent graphite homogeneously dispersed in the polymer matrix at a concentration equal to or above the percolation threshold and a second conductive filler of a different type at a concentration significantly below its respective percolation threshold. It describes specifically mixtures of a carbon black with carbon or graphite fibers and/or with metal or metallized carbon fibers. The use of such combination of conductive fillers is reasoned to enable adjusting a desirable, e.g. enhanced, electrical conductivity of the compound over a wide range without adversely affecting chemical or mechanical properties or processability of the polymeric composition. A combination of two or more different kinds of carbons blacks or means for providing antistatic or electrically conductive polymer compositions with reduced hysteresis is not disclosed therein.

Therefore, it is an objective of the present invention to provide antistatic or conductive polymeric compositions, which overcome or alleviate at least some of the above-mentioned deficiencies and limitations. It thus aims in particular to provide antistatic or conductive polymeric compositions with reduced hysteresis and good mechanical properties, suitable e.g. for the production of tires and mechanical rubber goods. The polymeric compositions further should be well processable and efficiently achievable at low costs from readily available materials.

SUMMARY OF THE INVENTION

This objective has surprisingly been achieved by providing an antistatic or electrically conductive polymeric composition as defined in appended independent claim 1. The composition comprises:
(a) an electrically insulating polymeric material,
(b) a first carbon black material having a statistical thickness surface area (STSA) of below 70 $m^2/g$ and an oil absorption number (OAN) in the range from 70 to 150 mL/100 g in an amount below its percolation threshold concentration, and
(c) a second carbon black material having an STSA of at least 100 $m^2/g$ and an OAN of at least 150 mL/100 g in an amount below its percolation threshold concentration,
wherein the total amount of the first carbon black material and the second carbon black material is sufficient to render the polymeric composition antistatic or electrically conductive. The first carbon black material can in particular comprise or be a lamp black.

The present invention is also drawn to a process for preparing such an antistatic or electrically conductive polymeric composition. The process comprises adding to an electrically insulating polymeric material (a) a first carbon black material having an STSA of below 70 m$^2$/g and an OAN in the range from 70 to 150 mL/100 g in an amount below its percolation threshold concentration, and (b) a second carbon black material having an STSA of at least 100 m$^2$/g and an OAN of at least 150 mL/100 g in an amount below its percolation threshold concentration, wherein the first carbon black material and the second carbon black material are used in a total amount that is sufficient to render the polymeric composition antistatic or electrically conductive.

The present invention furthermore relates to articles made from the above-mentioned antistatic or electrically conductive polymeric composition.

Moreover, it relates generally to the use of a combination of (a) a first carbon black material having an STSA of below 70 m$^2$/g and an OAN in the range from 70 to 150 mL/100 g and (b) a second carbon black material having an STSA of at least 100 m$^2$/g and an OAN of at least 150 mL/100 g as conductive filler or antistatic agent.

The characteristic carbon black filler combination according to the present invention allows providing antistatic or conductive polymeric compositions with balanced electrical and mechanical properties exhibiting reduced hysteresis, which are beneficial e.g. for the production of fuel saving tires, in an efficient and well controllable manner. The composition has a low hysteresis at high levels of stiffness and tensile strength combined with the intended antistatic or electrically conductive behavior. The polymeric composition further is well processable and suited for extrusion as well as affordable. The antistatic or electrically conductive polymeric compositions according to the present invention exhibit good processability and typically require a reduced total amount of carbon black filler and/or of expensive specialty carbon black such that they can be provided at comparatively low costs and resource consumption. Without intending to be bound by any theory, the inventors believe that a low specific area carbon black material with moderate structure (STSA<70 m$^2$/g and OAN from 70 to 150 mL/100 g) and a high specific surface area-high structure carbon black (STSA≥100 m$^2$/g and OAN≥150 mL/100 g) complement each other to allow at relatively low total carbon black loadings for formation of a flexible filler network in the polymer matrix, which efficiently conducts electrical charges and may reversibly adapt to external mechanical forces without much energy dissipation in the material.

These and other optional features and advantages of the present invention will be described in more detail in the following description with reference to the appended FIGURE.

BRIEF DESCRIPTION OF THE DRAWING(S)

FIG. 1 shows volume resistivity-concentration plots for different carbon black materials in a SMR10 natural rubber matrix according to Reference Examples 1-4.

DESCRIPTION OF THE INVENTION

As used herein, the term "comprising" is understood to be open-ended and to not exclude the presence of additional undescribed or unrecited elements, materials, ingredients or method steps etc. The terms "including", "containing" and like terms are understood to be synonymous with "comprising". As used herein, the term "consisting of" is understood to exclude the presence of any unspecified element, ingredient or method step etc.

As used herein, the singular form of "a", "an", and "the" include plural referents unless the context clearly dictates otherwise.

Unless indicated to the contrary, the numerical parameters and ranges set forth in the following specification and appended claims are approximations. Notwithstanding that the numerical ranges and parameters setting forth the broad scope of the invention are approximations, the numerical values set forth in the specific examples are reported as precisely as possible. Any numerical values, however, contain errors necessarily resulting from the standard deviation in their respective measurement.

Also, it should be understood that any numerical range recited herein is intended to include all subranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g. 1 to 6.3, or 5.5 to 10, or 2.7 to 6.1.

As mentioned above, the present invention relates to a polymeric composition. The polymeric composition comprises an electrically insulating polymeric material, a first carbon black material having a relatively low specific surface area and moderate structure and a second carbon black material having a relatively high specific surface area and structure. The first and second carbon black materials are used in a total amount which renders the polymeric composition antistatic or electrically conductive.

The term "composition" as used herein refers to a material composed of multiple constituent chemical species or components. The term "polymeric composition" refers to a composition that comprises at least one polymeric material. Accordingly, the "polymeric composition" can comprise a single type of polymeric material or two or more types of different polymeric materials. A "polymeric material" is understood as a material essentially consisting of a polymer. The term "polymer" is used herein in its common meaning in the art, referring to macromolecular compounds, i.e. compounds having a relatively high molecular mass (e.g. 500 da or more), the structure of which comprises multiple repetition units (also referred to as "mers") derived, actually or conceptually, from chemical species of relatively lower molecular mass.

The compositions according to the present invention comprise an electrically insulating polymeric material. "Electrically insulating" as used herein refers to a material, which exhibits an intrinsic volume resistivity of greater than $10^9$ Ω*cm. Accordingly, any kind of polymeric material that exhibits a volume resistivity greater than $10^9$ Ω*cm can be used in the practice of the present invention. Most known polymer materials are insulators with volume resistivities on the order of $10^{14}$ Ω*cm. The volume resistivity of a polymeric material can be determined according to DIN EN 62631-3-2:2016. The polymeric material can be organic or inorganic, typically it will be organic. Thermoplastic as well as duroplastic or thermoset polymers or polymer mixtures can be employed. For example, useful insulating polymeric materials in compositions of the invention include, but are not limited to thermosets such as epoxies, or urethanes, and thermoplastics such as polyesters, polycarbonates, polysulfones, polyimides, polyethers, such as polyether sulfone, and polyolefins such as light, medium and high density polyethylene, ethylene-propylene copolymers, either with random or block configuration, polypropylene-maleic acid anhydride, polystyrene, styrene-acrylonitrile copolymers, acrylonitrile-butadiene-styrene copolymers, polyacrylates, ethylene vinyl acetate, ethylene-acrylic acid copolymers, vinyl chloride-polypropylene copolymers, polyisobutylene, polybutadiene, and crosslinked polyethylene, whether chemically, thermally, UV or E-beam (EB) crosslinked, and polyphenylene sulfide, polyetheretherketone, polyetherimide, polyarylsulfone and polypropylene oxide modified polyether sulfones.

Particularly useful as polymeric materials for the practice of this invention are elastomers such as rubber materials. The composition may for example comprise one or more rubbers or elastomers containing olefinic unsaturation, i.e. diene-based rubbers or elastomers, as in case of vulcanizable polymeric compositions. The polymeric component may however also comprise other polymer or rubber materials containing no such unsaturation, for example thermoplastic or thermoset polymers. Suitable exemplary rubber materials which can be used as electrically insulating polymeric material in the compositions according to the invention include, but are not limited to natural and synthetic rubbers such as styrene-butadiene-copolymers, emulsion-styrene-butadiene rubber, solution-styrene-butadiene rubber, ethylene propylene diene monomer (EPDM) rubber, ethylene-propylene rubber (EPM) polybutadiene, polyisoprene, butyl rubber, chloroprene rubber, nitrile rubber, acrylonitrile-butadiene rubber, hydrogenated acrylonitrile-butadiene rubber, polymers and copolymers of butadiene, isoprene, piperylene and isomonoolefin with styrene or a methylstyrene, and halogenated rubber products such as halogenated butyl rubber, chlorinated polyethylene, or chlorosulfonated polyethylene, ethylene-vinylacetate rubber, ethylene-acrylic rubber, epichlorohydrin rubber, silicone rubber, fluorosilicone rubber, fluorocarbon rubber or a combination of any of the foregoing. The polymeric material can comprise only one polymer or a mixture of two or more different polymers such as for example a mixture of natural and synthetic rubber. The polymeric material can be supplied in any form, typically however as bales, chips, pellets or powder. Non-limiting specific rubber materials that can be used in the practice of the present invention comprise for example SMR10 rubber commercially available from Weber and Schaer, Vamac® Ultra HT commercially available from DuPont, Noxtite RE 461® commercially available from Unimatec, Europrene® 1500 commercially available from Versalis or Keltan® 4455 rubber commercially available from Arlanxco.

The polymeric material typically comprises the main component of the polymeric composition according to the present invention, i.e. comprises 50 wt. % or more, based of the total solids weight of the composition. For example, the polymeric material(s) can comprise 60 wt. % or more, or 70 wt. % or more of the composition, based on the total solids weight of the composition. The polymeric material(s) can for example comprise up to 90 wt. %, such as up to 80 wt. % of the composition, based on the total solids weight of the composition.

As set forth above, the composition according to the present invention further comprises a characteristic combination of first carbon black material and a second carbon black material.

The first carbon black material used according to the invention can be any carbon black material that has a statistical thickness surface area (STSA) of less than 70 m$^2$/g and an oil absorption number (OAN) in the range from 70 to 150 mL/100 g. For example, the first carbon black material can have an STSA of 60 m$^2$/g or less, preferably 50 m$^2$/g or less, such as 40 m$^2$/g or less, 30 m$^2$/g or less, or 20 m$^2$/g or less. The STSA of the first carbon black material can for example be in a range from 1 to less than 70 m$^2$/g such as from 5 to 50 m$^2$/g. The first carbon black material may for example have an OAN in the range from 80 to 145 mL/100 g, such as from 90 to 145 mL/100 g, or from 100 to 140 mL/100 g or from 110 to 130 mL/100 g. Ranges of the STSA and OAN between any of the recited limit values are likewise within the scope of the present invention. The statistical thickness surface area (STSA) can be determined according to ASTM D6556-17. The oil absorption number (OAN) represents a measure for the structure of a carbon black and can be measured according to ASTM D2414-18.

Further, the first carbon black material can have a compressed oil absorption number (COAN) measured according to ASTM D3493-18 of less than 100 mL/100 g, such as of less than 75 mL/100 g.

The first carbon black material can have an aggregate size distribution (ASD) characterized by a modal diameter $D_{mode}$ (also referred to as "mode"), which is the most frequent diameter in the ASD, of larger than 100 nm, such as of larger than 120 nm or larger than 150 nm, or larger than 200 nm, or larger than 250 nm, or larger than 300 nm or larger than 500 nm. The width of the size distribution can be expressed by its full width at half maximum (FWHM), also called AD50. According to DIN ISO 15825 AD50 represents the width of the distribution measured at the half-maximum point of the mode The aggregate size distribution of the first carbon black material can have a AD50 of at least 40 nm, such as of at least 60 nm, or at least 100 nm, or at least 150 nm, or at least 200 nm, or at least 300 nm, or at least 500 nm. The aggregate size distribution of a carbon black material can be measured by light scattering using a Brookhaven BI-DCP disc centrifuge as described in the US patent application published as US 2019/0062522 A1.

The second carbon black material used according to the invention can be any carbon black material that has a statistical thickness surface area (STSA) of at least 100 m$^2$/g and an oil absorption number (OAN) of at least 150 mL/100 g. For example, the second carbon black material can have an STSA of at least 100 m$^2$/g, such as at least 120 m$^2$/g, at least 150 m$^2$/g, at least 200 m$^2$/g, at least 300 m$^2$/g, at least 500 m$^2$/g, or at least 1000 m$^2$/g. The second carbon black material may have an OAN of at least 150 mL/100 g, at least 170 mL/100 g, at least 200 mL/g or at least 250 mL/100 g. The STSA and OAN can be measured as indicated above for the first carbon black material.

The second carbon black material further can have a COAN measured according to ASTM D3493-18 of more than 100 mL/100 g, such as of more than 120 mL/100 g.

Additionally, the second carbon black material can have an aggregate size distribution (ASD) characterized by a modal diameter $D_{mode}$ of less than 100 nm, such as less than 90 nm, or less than 80 nm, or less than 70 nm, or less than 60 nm, or less than 50 nm. The aggregate size distribution of the second carbon black material further can have a full-width-at-half-maximum (AD50) of less than 100 nm, such as less than 80 nm or less than 60 nm, or less than 50 nm, or less than 40 nm.

Carbon black materials having the afore-mentioned physical properties, which can be used as first or second carbon black material, respectively, in the practice of the present invention can be produced by controlled partial pyrolysis from hydrocarbon precursors according to established industrial processes such as the furnace process, gas black process, acetylene black process, thermal black process or lamp black process. The production of carbon blacks is per se well known in the art and for example outlined in J.-B. Donnet et al., "Carbon Black: Science and Technology", $2^{nd}$ edition, therefore being not described herein in more detail. Accordingly, the first and second carbon black materials used in the practice of the present invention can be selected from commercially available carbon black grades having the respective properties.

Carbon blacks useful as the first carbon black material typically comprise a lamp black and/or a furnace black. Furnace blacks suitable as first carbon black material according to the present invention can be exemplified for instance by ECORAX® S204, ECORAX® S470, PUREX® HS 45, PUREX® HS 25, CORAX® N6600, CORAX® N650 or CORAX® N550, all commercially available from ORION Engineered Carbons GmbH. Suitable lamp black material can be exemplified by DUREX® 0 or Lampblack 101, likewise available from ORION Engineered Carbons GmbH. Particularly favorable properties in terms of surprisingly high electrical conductivity and/or reduced hysteresis of the polymeric composition were achieved when a lamp black was used as the first carbon black material. Without being bound by any theory, the inventors believe that this may be associated to the relatively broad particle size distribution and/or relatively high purity of lamp blacks versus carbon blacks produced by other techniques.

The second carbon black material used according to the present invention typically comprises, but is not limited to, a furnace black. Carbon blacks especially useful as the second carbon black material according to the invention are highly conductive carbon blacks (also referred to as extraconductive carbon blacks), i.e. carbon blacks with a low percolation threshold concentration, as for example PRINTEX® XE2 B, XPB 538 or XPB 545, all available from ORION Engineered Carbons GmbH.

The first carbon black material and the second carbon black material are comprised in the polymeric composition according to the present invention each in an amount, which is below the respective percolation threshold concentration. As is well known and for example described in J.-B. Donnet et al., "Carbon Black: Science and Technology", $2^{nd}$ edition, the volume resistivity of a polymeric material generally decreases when an increasing amount of particulate conductive filler is added to the polymer matrix, with a transition from an insulating zone to a conductive zone via the so-called percolation zone, in which the conductive particles dispersed in the polymer matrix start forming a conductive filler network. The percolation threshold concentration is generally referred to as the filler concentration for which with the greatest change in volume resistivity is observed (i.e. the concentration corresponding to the greatest slope in a volume resistivity-filler concentration plot). More specifically, the "percolation threshold concentration" as used herein may mean the concentration of a carbon black material in a given insulating polymeric material, which is required to achieve a critical volume resistivity of $10^5$ $\Omega$*cm. The percolation threshold concentration can be determined as outlined in the examples.

As will be understood by the skilled artisan, the percolation threshold concentration depends on the type of conductive filler, e.g. carbon black, and the polymeric host material. Accordingly, the percolation threshold concentration will generally be different for distinct carbon black materials, for a given polymeric material, as also illustrated by FIG. 1. The percolation threshold concentration of the first carbon black will typically be greater than the percolation threshold concentration of the second carbon black in the practice of the present invention. The percolation threshold concentration of the first carbon black material may for example be at least 150%, at least 200%, at least 300%, or at least 400% of the percolation threshold concentration of the second carbon black material.

While the first and second carbon black materials are each used according to the present invention in an amount, which is below their respective percolation threshold concentration, the total amount of the first carbon black material and the second carbon black material is sufficient to render the polymeric composition antistatic or electrically conductive. As used herein, "antistatic" or "static dissipative" refers to a material having a volume resistivity in the range from $10^9$ to $10^4$ $\Omega$*cm. As used herein "electrically conductive" means that the respective material has a volume resistivity of below $10^4$ $\Omega$*cm.

According to the present invention, the first carbon black material is preferably used in a greater amount than the second carbon black material in the polymeric composition. For example, the first carbon black material can be present in the polymeric composition in an amount of from 50 to less than 100% of its percolation threshold concentration, preferably from 60 to 90%, more preferably from 65% to 85% of its percolation threshold concentration. The second carbon black material can for example be present in the composition in an amount of 50% or less, preferably 40% or less, such as 35% or less of its percolation threshold concentration. The weight ratio of the first carbon black material to the second carbon black material in the composition can for example be at least 5:1, preferably at least 6:1 and even more preferably at least 8:1.

The polymeric composition according to the invention can optionally comprise further electrically conductive fillers such as for example a further carbon black material different from the first and second carbon black materials described above, carbon fibers, metal-coated carbon fibers, carbon nanotubes, graphite, metallic fibers, or the like. Typically, the compositions according to the present invention will however not comprise a further electrically conductive filler in addition to the first and second carbon black materials.

The antistatic or electrically conductive compositions according to the present invention may optionally further comprise one or more additives commonly used in the art of formulation. Illustrative of such additives are for example oils and waxes; fillers such as titanium dioxide, silicon dioxide, zinc oxide, calcium carbonate, clays, calcium silicate, zinc sulfide, hydrous alumina and calcined magnesia, pigments, dyes, processing aids, rheology modifiers, silane coupling agents, vulcanizing agents, vulcanization accelerators, activators, sulfur curatives, antidegradants and antioxidants; heat or light stabilizers; plasticizers and the like. The person skilled in the art will select such optional additives and their respective amounts in accordance with the desired properties and/or application of the polymeric composition.

The polymeric composition according to the invention can in particular be a curable composition, such as for example a curable rubber composition. The curing reaction can be induced by any means known in the art such as by light, moisture, heat and/or addition of a crosslinker. The curing reaction can for example be a vulcanization. Suitable curatives comprised in the polymeric composition can for example comprise sulfur, peroxides, metal oxides or the like.

According to the invention, the polymeric composition can exhibit, e.g. when cured, a Modulus 300% of at least 5

MPa, such as at least 8 MPa, at least 9 MPa, or at least 10 MPa. Further, the polymeric composition, e.g. when cured, can have a tensile strength of 10 MPa or more, such as 15 MPa or more, or 20 MPa or more. The polymeric composition, e.g. when cured, can have a low hysteresis reflected by a loss factor tan δ of 0.060 or less, preferably of 0.058 or less, even more preferably of 0.056 or less. The loss factor tan δ can be measured according to DIN 53 513 in strain-controlled mode (1±0.5 mm) on a cylindrical specimen (10 mm in height and 10 mm in diameter) at 60° C. with a frequency of 16 Hz.

As it will be appreciated, the compositions according to the invention can be utilized in various technical applications requiring polymer-based materials with antistatic or electrically conductive properties, mechanical strength and/or stiffness and/or low hysteresis. Accordingly, the invention also relates to an article made from or comprising the afore-mentioned antistatic or electrically conductive polymeric composition. Non-limiting examples of such articles are for instance tires, tire components, cable sheaths, tubes, drive belts, conveyor belts, roll coverings, shoe soles, sealing members, profile or dampening elements. Due to the exceptionally low hysteresis attainable combined with adequate electrical and mechanical characteristics the compositions according to the present invention are particularly interesting for the production of fuel saving tires having a reduced rolling resistance and heat build-up.

The antistatic or electrically conductive polymeric compositions according to the present invention can be produced by adding to an electrically insulating polymeric material
  a first carbon black material having a statistical thickness surface area (STSA) of below 70 m²/g and an oil absorption number (OAN) in the range from 70 to 150 mL/100 g in an amount below its percolation threshold concentration, and
  a second carbon black material having a statistical thickness surface area (STSA) of at least 100 m²/g and an oil absorption number (OAN) in an amount below its percolation threshold concentration,
  wherein the first carbon black material and the second carbon black material are used in a total amount that is sufficient to render the polymeric composition antistatic or electrically conductive. The process may further comprise homogenizing the antistatic or electrically conductive polymeric composition, such as by stirring, milling, kneading or a combination thereof.

The carbon black materials may thus be finely dispersed in the electrically insulating polymeric material. Dispersion can be achieved by any means known in the art such as by mixing, stirring, milling, kneading, ultrasound, a dissolver, a shaker mixer, rotor-stator dispersing assemblies, or high-pressure homogenizers or a combination thereof. For example, a lab mixer with intermeshing rotor geometry can be used. The dispersing can for example be conducted until the carbon black materials are homogeneously dispersed in the polymeric composition resulting in a dispersion index of larger than 95% or more, preferably 97 or more, or more than 99% according to the classification pursuant to ASTM D2663-88, test method B.

According to the invention, preparation of the composition may for example be conducted in two steps: At first, the first carbon black material, the second carbon black material, and optionally non-curative additives, if used, are added to the electrically insulating polymeric material concomitantly or successively, such as by adding the second carbon black material after the first carbon black material or by adding the first carbon black material after the second carbon black material to the electrically insulating polymeric material. The polymeric material, the carbon black materials and any additives, if present, may then be mixed at an elevated temperature such as below 160° C. for a total mixing time of less than 10 min, preferably of about 6 min. In a subsequent second step, the mixture obtained from the first step is blended with a curing composition comprising one or more curative additives for less than 5 min, typically less than 3 min, preferably for about 2.5 min, at a temperature of less than 115° C.

The process can comprise further steps such as extrusion or cooling down the product to room temperature and storing it for further processing. The process can further comprise a curing step, which can for example be carried out by subjecting the composition to thermal curing conditions, e.g. a temperature of 120-200° C. for a time of 5 to 30 min.

Having above generally described the present invention, a further understanding can be obtained by reference to the following specific examples. These examples are provided herein for purposes of illustration only, and are not intended to limit the present invention, which is rather to be given the full scope of the appended claims including any equivalents thereof.

EXAMPLES

All parts and percentages referred to herein refer to weight, unless indicated otherwise.

Carbon Black Materials

The following carbon black materials were used as electrically conductive fillers to prepare electrically dissipative or conductive polymer compounds:

DUREX® 0: Lamp black with an STSA of about 17 m²/g and an OAN of about 135 mL/100 g, commercially available from Orion Engineered Carbons GmbH CORAX® N550: Furnace black with an STSA of about 39 m²/g and an OAN of about 121 mL/100 g, commercially available from Orion Engineered Carbons GmbH CORAX® N772: Furnace black with an STSA of about 30 m²/g and an OAN of about 65 mL/100 g, commercially available from Orion Engineered Carbons GmbH PRINTEX® XE2 B: Highly conductive carbon black with an STSA of about 950 m²/g and an OAN of about 420 mL/100 g, commercially available from Orion Engineered Carbons GmbH XPB 538: Highly conductive carbon black with an STSA of about 550 m²/g and an OAN of about 280 mL/100 g, commercially available from Orion Engineered Carbons GmbH The statistical thickness surface area (STSA) of the carbon blacks was determined according to ASTM D6556-17.

The oil absorption number (OAN) of the carbon blacks was determined according to ASTM D2414-18a.

Preparation of Reference Rubber Compounds with Systematically Varied Single Type of Carbon Black Filler for Determination of the Percolation Threshold Concentration Rubber compounds with a systematically varied amount of a single type of the afore-mentioned carbon black fillers were prepared as follows according to the formulation indicated in Table 1.

TABLE 1

| Ingredient | Amount (phr) |
|---|---|
| SMR10[1] | 100 |
| Carbon black | variable |
| Vivatec 500[2] | 3 |
| ZnO | 3 |
| Stearic acid | 2 |
| Vulkanox 4020/LG[3] | 2 |
| Protektor G3108[4] | 1.5 |
| Kristalex F85[5] | 3 |
| Sulphur | 1.5 |
| Vulkacit CZ/EG-C[6] | 1 |

[1]Natural rubber, available from Weber & Schaer
[2]Mineral oil, available from Hansen & Rosenthal KG
[3]Antioxidant, available from Lanxess
[4]Microcrystalline wax, available from Paramelt
[5]Hydrocarbon resin, available from Eastman Chemical
[6]Vulcanization accelerator, available from Lanxess The polymer component was introduced to a laboratory mixer GK1.5E with an intermeshing PES5-rotor geometry made by Harburg Freudenberger and milled for 30 seconds at a chamber temperature of 40° C. and a rotor speed of 60 rpm. Subsequently, the carbon black, Vivatec 500, ZnO, stearic acid, Vulkanox 4020/LG, Protektor G3108 and Kristalex F85 were added in the indicated amounts under stirring. The respective amounts of carbon black used are indicated in Table 2 below. After further 90 seconds the ram was lifted and cleaned and the batch was mixed again for 90 seconds. After in total 4 minutes the batch was dropped on an open mill for cooling down and additional distributive mixing. The batch temperature did not exceed 160° C. in the first mixing step. In a second mixing step the sulphur and the accelerator (Vulkacit CZ/EG-Z) were then added in the indicated amounts to the master batch obtained from the first mixing step. The resulting mixture was milled in the GK1.5E mixer at a chamber temperature of 40° C. for 2 minutes. The rotor speed was 40 rpm and it was secured that the batch temperature did not exceed 105° C. Subsequently, the mixture was processed again on an open mill.

The resulting vulcanizable compositions (green compounds) were cured for about 20 minutes at a temperature of 150° C.

The volume resistivity of the thus obtained cured compositions was then measured according to DIN EN 62631-3-2:2016. The results are summarized below in Table 2.

TABLE 2

| Reference Example 1 DUREX ® 0 | | Reference Example 2 CORAX ® N550 | | Reference Example 3 CORAX ® N772 | | Reference Example 4 XPB538 | |
|---|---|---|---|---|---|---|---|
| Conc. [phr] | Vol. Res. [Ω*cm] | Conc. [phr] | Vol. Res. [Ω*cm] | Conc. [phr] | Vol. Res. [Ω*cm] | Conc. [phr] | Vol. Res. [Ω*cm] |
| 40 | 3.64E+13 | 25 | 1.55E+14 | 30 | 1.33E+14 | 5 | 2.59E+15 |
| 45 | 7.31E+06 | 30 | 6.13E+13 | 35 | 1.11E+14 | 10 | 6.68E+08 |
| 50 | 9.57E+05 | 35 | 2.69E+09 | 40 | 1.19E+14 | 12.5 | 3.29E+04 |
| 55 | 8.99E+02 | 40 | 4.00E+06 | 45 | 9.66E+13 | 15 | 4.76E+02 |
| 60 | 3.94E+02 | 45 | 4.60E+04 | 50 | 6.07E+11 | 17.5 | 2.13E+02 |
| 70 | 1.15E+02 | 50 | 4.33E+03 | 55 | 1.20E+11 | 20 | 1.74E+02 |
| 75 | 6.51E+01 | 55 | 3.15E+03 | 60 | 1.46E+07 | 22.5 | 1.09E+02 |
| | | 60 | 9.18E+02 | 65 | 8.97E+06 | 25 | 7.55E+01 |
| | | 65 | 9.28E+02 | 70 | 4.19E+04 | 27.5 | 6.99E+01 |
| | | 70 | 5.65E+02 | 75 | 3.38E+04 | 30 | 6.22E+01 |
| | | 75 | 2.40E+02 | 80 | 6.35E+03 | 35 | 5.64E+01 |

FIG. 1 shows a plot of the volume resistivity as a function of the carbon black concentration for Reference Examples 1-4. For each carbon black grade a transition from an isolation region to a conductive region occurs with increasing carbon black concentration. This transition occurs at a carbon black loading, which increases in the order of XPB538<N550<Durex0<N772. The dashed horizontal line shown in FIG. 1 designates a volume resistivity of $10^5$ Ω*cm. The percolation threshold concentration, i.e. the filler concentration at which the rubber compound passes from the isolation zone to the conductive zone and attains a volume resistivity of $10^5$ Ω*cm, is determined as the value of the X-axis at the intersection of the respective volume resistivity-concentration curve with the dashed horizontal line. For the given rubber material, the following percolation threshold concentrations were accordingly determined: about 12 phr for XPB538, about 44 phr for N550, about 52 phr for Durex 0, and about 68 phr for N772. PRINTEX® XE2 B (not shown) exhibited as a highly conductive carbon black similar to XPB538 a critical carbon black concentration of about 10 phr in the given rubber material. Durex0 exhibited a surprisingly low percolation threshold concentration considering that its specific surface area is significantly smaller than in case of N772.

Preparation of Electrically Conductive Rubber Compounds Using Single Types of Carbon Black Fillers Versus Combinations Thereof Rubber compounds having a comparable volume resistivity on the order of $10^4$ Ω*cm were prepared according to the formulation of Table 1 and the procedure described above in the context of Reference Examples 1-4, using different kinds of carbon blacks, either singly (Comparative Examples 6-9) or in combination (Comparative Example 10 and Examples 11-13) in the amounts indicated below in Table 3. An unfilled rubber compound containing no carbon black was moreover prepared as a reference (Comparative Example 5).

Characterization of the Vulcanized Polymeric Compositions

The thus prepared rubber compounds of Examples 5-13 were analyzed for their physical properties according to following methods:

Volume resistivity was measured according to DIN EN 62631-3-2:2016.

Tensile strength, elongation at break and modulus 300% were measured according to DIN 53 504.

Shore A Hardness was measured according to DIN 53 505.

Loss factor tan δ was measured according to DIN 53 513 in strain-controlled mode (1±0.5 mm) on a cylindrical specimen (10 mm in height and 10 mm in diameter) at 60° C. with a frequency of 16 Hz.

As a measure for filler dispersion the coefficient of dispersion was determined by means of surface topography, inclusive of Medalia correction, according to the procedure described in A. Wehmeier, "Filler Dispersion Analysis by Topography Measurements", Technical Report TR 820, Degussa GmbH as well as in A. Wehmeier, "Entwicklung eines Verfahrens zur Charakterisierung der Füllstoffdispersion in Gummimischungen mittels einer Oberflächentopographie", thesis, 1998 at the Münster University of Applied Sciences, and DE 199 17 975 C2. The coefficient of dispersion obtained according to this method generally correlates well (e.g. with coefficient of determination >0.95) with the coefficient of dispersion determined by optical methods, such as those determined according to ASTM D2663-88, test method B. In Table 3 below, instead of the coefficient of dispersion, the peak area (%) likewise described in said surface topography-based method is reported as a measure of filler dispersion. The better the dispersion, the smaller the peak area.

a combination of carbon blacks in accordance with the present invention was used a reduction of the hysteresis beyond the level achievable by the use of the extraconductive carbon black alone is observed (cf. Examples 11-13 versus Comparative Example 10). The rubber compounds according to the invention (Examples 11-13) accordingly exhibit a reduced low hysteresis at high levels of stiffness and tensile strength combined with the targeted electrically conductive behavior and acceptable processability/degree of dispersion reflected by a sufficiently small peak area. Due to the reduced total amount of carbon black filler compared to corresponding compounds containing only the respective coarse particulate carbon black, and a comparatively small amount of the extraconductive carbon black material the rubber compositions according to the present invention can be provided at comparatively low costs and resource consumption.

TABLE 3

| Example | | 5* | 6* | 7* | 8* | 9* | 10* | 11 | 12 | 13 |
|---|---|---|---|---|---|---|---|---|---|---|
| DUREX ® 0 | [phr] | | 53 | | | | | 42 | | 44 |
| CORAX ® N550 | [phr] | | | 47.5 | | | | | 32.5 | |
| CORAX ® N772 | [phr] | | | | 70 | | 50 | | | |
| PRINTEX ® XE2 B | [phr] | | | | | | 3 | | | |
| XPB 538 | [phr] | | | | | 12.5 | | 3 | 4 | 3 |
| Volume Resistivity | [$\Omega$*cm] | 1.00E+13 | 1.41E+04 | 7.24E+04 | 6.32E+04 | 3.29E+04 | 8.71E+04 | 9.32E+04 | 3.44E+04 | 2.19E+04 |
| Peak Area | [%] | 0.78 | 0.55 | 0.23 | 0.28 | 12.24 | 1.28 | 4.35 | 0.83 | 4.16 |
| Modulus 300% | [MPa] | 1.4 | 10.3 | 11.9 | 11.8 | 2.7 | 10 | 9.5 | 9.1 | 10.1 |
| Tensile Strength | [MPa] | 9.7 | 20.0 | 26.1 | 22.6 | 14.4 | 23.6 | 22.6 | 28 | 22.4 |
| Elongation at Break | [%] | 636 | 482 | 526 | 494 | 588 | 510 | 524 | 575 | 507 |
| Hardness | [SH] | 33 | 57 | 52 | 57 | 40 | 52 | 54 | 53 | 56 |
| tan δ | [%] | 0.014 | 0.063 | 0.068 | 0.083 | 0.059 | 0.061 | 0.054 | 0.055 | 0.056 |

*Comparative Example

The results are summarized in Table 3 below. As can be seen from Table 3, the unfilled rubber compound (Comparative Example 5) is electrically insulating and has relatively poor mechanical properties. The rubber compound can be rendered electrically conductive and the material hardened and stiffened by the addition of a coarse particulate carbon black e.g. of the DUREX® 0, CORAX® N550 or CORAX® N772 type. However, substantial amounts of such filler are required as their percolation threshold concentrations are relatively high. Accordingly, these filled rubber compounds exhibit a high loss factor tan δ (cf. Comparative Examples 6-8). A lower hysteresis can be achieved by use of an extraconductive carbon black grade (XPB 538), however, in this case the hardness, modulus and tensile strength are significantly inferior (cf. Comparative Example 9). Moreover, the relatively high peak area indicates challenges in finely dispersing such extracondutive carbon black material. The compositions of Examples 10-13 on the other hand comprised a mixture of a coarse particulate carbon black and an extraconductive carbon black material each in an amount below its percolation threshold concentration as can be seen from Reference examples 1-4. Still, the total amount of carbon black material was sufficient to provide for the targeted volume resistivity. As can be seen from the data in Table 3, these rubber compositions exhibit balanced electrical and mechanical properties at a reduced overall carbon black consumption compared to the use of the respective coarse particulate carbon black alone. However, only when Preparation of an Antistatic Rubber Compound Using a Single Type of Carbon Black Filler or a Combination of Carbon Blacks in Accordance with the Present Invention Electrically dissipative rubber compounds having a comparable volume resistivity on the order of 106 $\Omega$*cm were prepared according to the formulation of Table 1 and the procedure described above in the context of Reference Examples 1-4, using either N550 carbon black alone (Comparative Example 14) or in combination with XPB 538 (Example 15) in the amounts indicated in Table 4. The properties of the obtained filled rubber compounds were analyzed as described above and are reported in Table 4.

TABLE 4

| Example | | 14* | 15 |
|---|---|---|---|
| CORAX ® N550 | [phr] | 45 | 30 |
| XPB 538 | [phr] | | 4 |
| Volume Resistivity | [$\Omega$ * cm] | 5.13E+06 | 1.43E+06 |
| Peak Area | [%] | 0.3 | 0.76 |
| Modulus 300% | [MPa] | 10.9 | 9.7 |
| Tensile Strength | [MPa] | 24.9 | 26.9 |
| Elongation at Break | [%] | 520 | 550 |
| Hardness | [SH] | 51 | 53 |
| tan δ | [%] | 0.065 | 0.053 |

*Comparative Example

As can be seen from Table 4, use of the combination of carbon blacks in accordance with the present invention yields an antistatic rubber compound having a significantly reduced hysteresis at even lower volume resistivity and comparable mechanical properties compared to the corresponding rubber compound containing only N550, at even lower total carbon black consumption.

As illustrated by the Examples above the present invention thus allows to provide antistatic or electrically conductive polymeric materials with a balanced profile of electrical and mechanical properties and reduced hysteresis, which is beneficial e.g. for the production of fuel saving tires.

The invention claimed is:

1. A polymeric composition comprising:
   a) an electrically insulating polymeric material,
   b) a first carbon black material having a statistical thickness surface area (STSA) measured according to ASTM D6556-17 of below 70 m²/g and an oil absorption number (OAN) measured according to ASTM D2414-18 in the range from 70 to 150 mL/100 g, wherein the first carbon black material comprises a lamp black, and
   c) a second carbon black material having a statistical thickness surface area (STSA) measured according to ASTM D6556-17 of at least 100 m²/g and an oil absorption number (OAN) measured according to ASTM D2414-18 of at least 150 mL/100 g,
   wherein the polymeric composition comprises 50 wt. % or more of the polymeric material, based on the total solids weight of the composition, and
   wherein the polymeric composition has a volume resistivity of less than $10^9$ Ω*cm.

2. The polymeric composition according to claim 1, wherein the electrically insulating polymeric material comprises an elastomer.

3. The polymeric composition according to claim 1, wherein the first carbon black material is present in the composition in an amount of from 50 to less than 100% of its percolation threshold concentration and/or wherein the second carbon black material is present in the composition in an amount of 50% or less of its percolation threshold concentration.

4. The polymeric composition according to claim 1, wherein the weight ratio of the first carbon black material to the second carbon black material in the composition is at least 5:1.

5. The polymeric composition according to claim 1, wherein the first carbon black material exhibits a percolation threshold concentration, which is greater than the percolation threshold concentration of the second carbon black material.

6. The polymeric composition according to claim 1, wherein the second carbon black material comprises a furnace black.

7. The polymeric composition according to claim 1, wherein the first carbon black material has a statistical thickness surface area (STSA) measured according to ASTM D6556-17 of 60 m²/g or less and/or has an oil absorption number (OAN) measured according to ASTM D2414-18 in the range from 80 to 145 mL/100 g.

8. The polymeric composition according to claim 1, wherein the second carbon black material has a statistical thickness surface area (STSA) measured according to ASTM D6556-17 of at least 150 m²/g and/or has an oil absorption number (OAN) measured according to ASTM D2414-18 of at least 170 mL/100 g.

9. The polymeric composition according to claim 1, wherein the polymeric composition is a curable rubber composition.

10. The polymeric composition according to claim 9, wherein the rubber composition, when cured, exhibits a modulus M300% of at least 5 MPa and/or a tensile strength of at least 10 MPa and/or a loss factor tan δ (at 60° C.) of less than 0.06.

11. The polymeric composition according to claim 9, wherein the rubber composition, when cured, exhibits a modulus M300% of at least 8 MPa and/or a tensile strength of at least 15 MPa and/or a loss factor tan δ (at 60° C.) of less 0.056 or less.

12. An article made from the polymeric composition according to claim 1.

13. The article according to claim 12 being a tire, a tire component, a cable sheath, a tube, a drive belt, a conveyor belt, a roll covering, a shoe sole, a sealing member, a profile, or a dampening element.

14. The polymeric composition according to claim 1, wherein the first carbon black material is present in the composition in an amount of from 60 to 90% of its percolation threshold concentration and/or wherein the second carbon black material is present in the composition in an amount of 40% or less of its percolation threshold concentration.

15. The polymeric composition according to claim 1, wherein the percolation threshold concentration of the first carbon black material is at least 150% of the percolation threshold concentration of the second carbon black material.

16. The polymeric composition according to claim 1, wherein the first carbon black material has a statistical thickness surface area (STSA) measured according to ASTM D6556-17 of 50 m²/g or less and/or has an oil absorption number (OAN) measured according to ASTM D2414-18 in the range from 100 to 140 mL/100 g.

17. The polymeric composition according to claim 1, wherein the second carbon black material has a statistical thickness surface area (STSA) measured according to ASTM D6556-17 of at least 200 m²/g and/or has an oil absorption number (OAN) measured according to ASTM D2414-18 of at least 200 mL/g.

18. A process for preparing a polymeric composition, comprising:
   adding to an electrically insulating polymeric material
   a) a first carbon black material having a statistical thickness surface area (STSA) measured according to ASTM D6556-17 of below 70 m²/g and an oil absorption number (OAN) measured according to ASTM D2414-18 in the range from 70 to 150 mL/100 g amount below its percolation threshold concentration wherein the first carbon black material comprises a lamp black, and
   b) a second carbon black material having a statistical thickness surface area (STSA) measured according to ASTM D6556-17 of at least 100 m²/g and an oil absorption number (OAN) measured according to ASTM D2414-18 of at least 150 mL/100 g,
   wherein the polymeric composition comprises 50 wt. % or more of the polymeric material, based on the total solids weight of the composition, and
   wherein the resulting polymeric composition has a volume resistivity of less than $10^9$ Ω*cm.

19. The process according to claim 18 further comprising homogenizing the polymeric composition.

20. A conductive filler or antistatic agent comprising a combination of a first carbon black material having a statistical thickness surface area (STSA) measured according to ASTM D6556-17 of below 70 m²/g and an oil absorption number (OAN) measured according to ASTM D2414-18 in the range from 70 to 150 mL/100 g and a second carbon black material having a statistical thickness surface area (STSA) measured according to ASTM D6556-17 of at least 100 m$^2$/g and an oil absorption number (OAN) measured according to ASTM D2414-18 of at least 150 mL/100 g, wherein the first carbon black material comprises a lamp black.

\* \* \* \* \*